Patented Apr. 10, 1945

2,373,347

UNITED STATES PATENT OFFICE 2,373,347

PREPLASTICIZED VINYL POLYMERS

Frank K. Schoenfeld, Silver Lake, Ohio, assignor to The B. F. Goodrich Company, New York, N. Y., a corporation of New York No Drawing. Application March 1, 1941, Serial No. 381,379

4 Claims. (Cl. 260—32)

This invention relates to vinyl resin compositions and pertains specifically to a new method for introducing the plasticizer into such compositions.

It is well known that a variety of vinyl compounds, such as vinyl chloride, vinyl bromide, vinyl acetate, vinyl cyanide, vinylidene chloride, and the like may be polymerized either alone or in the presence of each other by means of suitable catalysts. The products of such a polymerization often require the incorporation of plasticizers to prepare them for the uses to which they are put, but the products are in general irregular masses or powders possessing a rough, hard, and horny surface; if the polymerization is carried out in aqueous emulsion the polymer granules may also have adsorbed on their surface a layer of dry hydrophilic material, all of which makes incorporation of plasticizer slow and difficult.

In the case of most of these polymers, and especially in the case of polymers of which the predominant constituent is vinyl chloride, such as gamma polyvinyl chloride and copolymers of vinyl chloride with minor proportions of vinyl cyanide, vinyl acetate, vinylidene chloride and the like, it is necessary to use rather high temperatures in order to secure the necessary dissolution of the polymer in the plasticizer. If sufficient plasticizer be employed, the solution may be effected at temperatures at which the mixture forms a liquid solution, but it is usually preferred to mix the polymer and plasticizer by kneading at a lower temperature at which the product is semi-liquid or plastic. In either case, the temperatures required are fairly high, in the neighborhood of 120° C. or over, and even at these high temperatures the process requires on undesirably long time. For example, in the case of gamma polyvinyl chloride made by heterogeneous polymerization (in an aqueous emulsion) it requires from 25 to 60 minutes to obtain substantially complete solution and homogenization of a 75 lb. batch with the usual plasticizers on a 60 inch roll mill at about 130° C. A polyvinyl chloride made by homogeneous polymerization, although requiring less time, still takes from 15 to 30 minutes for homogenization.

These high temperatures and long milling times are undesirable for two reasons: first, the decomposition of the polymer is promoted, and second, the cost of the finished product is greatly increased.

I have discovered a new method of plasticization which can be successfully carried out at temperatures below 100° C. and which yields a plasticized polymer in a form hitherto unknown. My invention involves the use of a volatile liquid vehicle in which neither polymer nor plasticizer is soluble, but in which they can be dispersed or suspended. The most convenient and cheapest vehicle is of course water, especially for polymers made by emulsion polymerization since they are obtained in the form of suspension in water. Other vehicles with similar physical properties may, however, be used, such as methoxymethanol, methoxyethanol, n-propanol, i-propanol, methoxyacetic acid, ethylene glycol methyl glycollate, glycerin, hexane, heptane, methyl lactate, hydroxy acetone, lactic acid, formamide, formal, n-butanol, Cellosolve, methyl Cellosolve, ethylidene dimethyl ether, ethanolamine, methylolamine, and the like. These materials tend to dissolve the plasticizer, however, and for that reason are not so desirable as water.

In the preferred form of my invention an emulsion or suspension of a vinyl polymer is formed in water, either by polymerizing the monomer in the water or by dispersing a solid polymer of fine particle size, using a wetting agent if desired. The dispersion may be formed merely by mechanical stirring, or by means of a wetting or emulsifying agent in conjunction with stirring. I have obtained satisfactory results without a wetting agent in all cases where the polymer has a fine particle size, and there appears to be no great advantage to be obtained by using a wetting agent; however, if it is desired to use one, any of the ordinary agents, such as gelatin, the alkali metal, ammonium, or amine salts of the higher fatty acids, or of the sulfonic acids, or of the acid sulfuric esters of organic compounds containing more than eight carbon atoms, or similar materials are satisfactory. The plasticizer, which may be any one of those commonly used for the vinyl polymers, may be added in the form of a separate emulsion in water, or it may be dispersed directly in the polymer suspension by means of stirring.

In order to obtain plasticization of each polymer particle it is necessary that there be sufficient water present to permit efficient stirring. I have found that a ratio of about six to fifteen volumes of water to one of polymer is convenient, although smaller or larger ratios may be desirable in many cases. By using a smaller amount of water and molding the mixture under pressure before removal of the water, a rubber-like spongy mass of plasticized polymer may be formed. The amount of plasticizer used depends primarily upon the physical properties desired in the product and may vary from about 50 to 500 volumes per 100 volumes of polymer.

The mixed emulsion of plasticizer and polymer is heated, with stirring, to a temperature which may be slightly below the boiling point of water, and is maintained at that temperature until the plasticizer has been absorbed by the polymer. The length of time required depends upon the temperature at which the operation is carried out, the amount of plasticizer used and the particle size of the polymer. Low temperatures and large amounts of plasticizer require longer heating and stirring. By employing a closed vessel and pressure greater than atmospheric the emulsion may be heated to temperatures above the boiling point of water or whatever other vehicle be used, but this procedure is usually unnecessary. The product, after filtration and drying, is obtained as a free-flowing powder which has much the appearance of damp salt; the individual granules, instead of being hard and horny, as in the case of the unplasticized polymer, are soft and pliable. In short, the material is a plasticized vinyl polymer in granulated form. If the polymer was originally prepared by emulsion polymerization, the swollen particles of the plasticized polymer retain the characteristic approximately spherical shape of the emulsion polymer, which makes the product especially easy to handle. In this form the plasticized polymer is much more easily handled than when it is in slabs or sheets; the plasticized polymer granules can be weighed out into batches and can be sheeted out on a mill much more rapidly than the plasticized polymer in sheet or slab form.

This "preplasticized polymer," as I choose to call it, can be sheeted on a roll mill to give a completely homogeneous sheet in about 20% to 30% of the time required for homogenizing untreated polymer with the same amount of plasticizer. The same relation holds true if the homogenization is carried out in other ways, such as in an internal mixer. My invention, therefore, eliminates very largely the decomposition of the polymer caused by exposing it to high temperatures, reduces greatly the cost of the expensive milling or homogenizing operation, and provides a plasticized polymer in a form hitherto unknown.

As an indication of the degree of absorption of the plasticizer by the polymer in the process of this invention, the extent of bleeding of the treated product at room temperature may be observed. If absorption is incomplete bleeding is noticeable almost immediately. If the plasticizer is completely absorbed, no bleeding can be observed even after several months.

As specific examples of my invention, I have prepared various pre-plasticized polymers as indicated in the following tables, forming the aqueous dispersion by means of stirring alone, without the addition of any wetting agent:

Example I

| | | | | | | | | |
|---|---|---|---|---|---|---|---|---|
| Water, vol | 865 | 865 | 865 | 1,540 | 1,540 | 1,540 | 1,540 | 755 |
| Dioctyl phthalate, vol | 78 | 78 | 78 | 250 | 250 | 250 | 250 | 62 |
| Gamma polyvinyl chloride, vol | 100 | 100 | 100 | 100 | 100 | 100 | 100 | 100 |
| Temperature, °C | 22 | 60 | 90 | 99 | 87 | 99 | 99 | 99 |
| Time of stirring, min | 10 | 10 | 10 | 150 | 40 | 40 | 10 | 10 |
| Bleeding | Yes | Yes | No | No | Yes | No | No | No |

Example II

| | | | |
|---|---|---|---|
| Water, vol | 617 | 935 | 746 |
| Tricresyl phosphate, vol | 60 | | |
| Dioctyl phthalate, vol | | 72.5 | 48 |
| Gamma polyvinyl chloride, vol | 100 | | |
| 5% vinylidene chloride, 95% vinyl chloride copolymer, vol | | 100 | |
| 20% vinylidene chloride, 80% vinyl chloride copolymer, vol | | | 100 |
| Temperature, °C | 90 | 90 | 90 |
| Time of stirring, min | 10 | 10 | 10 |
| Bleeding | No | No | No |

Example III

| | | | | |
|---|---|---|---|---|
| Water, vol | 880 | 880 | 880 | 880 |
| Dioctyl phthalate, vol | 82.7 | | | |
| Tricresyl phosphate, vol | | 68.7 | | |
| Dibutyl phthalate, vol | | | 76.7 | |
| Butyl phthalyl butyl glycollate, vol | | | | 73.2 |
| Gamma polyvinyl chloride, vol | 100 | 100 | 100 | 100 |
| Temperature, °C | 85 | 85 | 85 | 85 |
| Time of stirring, min | 10 | 10 | 10 | 10 |
| Bleeding | No | No | No | No |
| A | 7 | 10 | 4 | 5 |
| B | 32 | 25 | 12 | 15 |

A=Time, in minutes, required to homogenize the pre-plasticized polymer on a roll mill at 115° C.
B=Time, in minutes, required to homogenize batch with the same plasticizer content and untreated polymer on a roll mill at 115° C.

These results indicate very clearly the advantages of my invention as described above, namely, the lower temperatures and decreased milling times required for homogenization, and also show that the process, when properly carried out, leads to complete absorption of the plasticizer in the polymer.

My pre-plasticized polymer after milling may be used in any of the ways that the usual plasticized polymer is used. Pigments, fillers, stabilizers, dyes, and other materials may be added to it to obtain varied effects. It may be extruded, calendered, molded, or used in the form of a solution in a suitable solvent. It may also be used for many of these purposes in the powdered form.

Although I have herein disclosed specific embodiments of my invention, I do not intend to limit myself solely thereto, for many modifications and variations lie within the spirit and scope of my discovery as defined in the appended claims.

I claim:

1. The process of plasticizing gamma polyvinyl chloride which comprises agitating a suspension of the unplasticized polyvinyl chloride and the plasticizer in water at a temperature of about 90° C. until the plasticizer is absorbed by the polyvinyl chloride, and removing the water.

2. The process of preparing a plasticized polymer, which comprises polymerizing vinyl chloride emulsified in water to the gamma polymer, adding a plasticizer to the resultant suspension of polymer, and agitating the mixture at a temperature of about 90° C. until the plasticizer is absorbed by the polymer.

3. The process of plasticizing gamma polyvinyl chloride which comprises agitating a suspension of the unplasticized polyvinyl chloride and the plasticizer in water at a temperature between about 85° and about 99° C. until the plasticizer is absorbed by the polyvinyl chloride, and removing the water.

4. The process of preparing a plasticized polymer, which comprises polymerizing vinyl chloride emulsified in water to the gamma polymer, adding a plasticizer to the resultant suspension of polymer, and agitating the mixture at a temperature of about 85° to about 99° C. until the plasticizer is absorbed by the polymer.

FRANK K. SCHOENFELD.